July 31, 1934.   R. RICHTER   1,968,222
CONVERGING ACHROMATIC EYEPIECE
Filed June 14, 1933
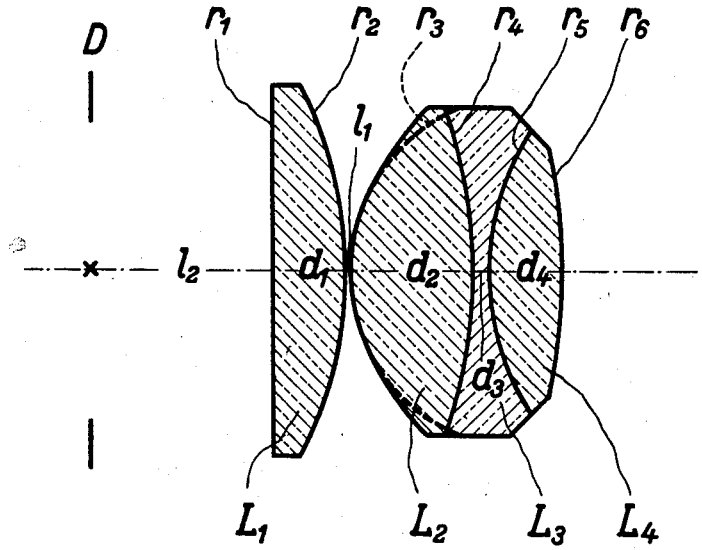
$r_1 = \infty$
$d_1 = 30.0;$ $n_d = 1.5163;$ $\nu = 64.0$
$r_2 = -162.5$
$l_1 = 1.5$
$r_3 = 71.5$
$d_2 = 50.0;$ $n_d = 1.5163;$ $\nu = 64.0$
$r_4 = -200.0$
$d_3 = 6.5;$ $n_d = 1.6477;$ $\nu = 33.9$
$r_5 = 100.0$
$d_4 = 30.0;$ $n_d = 1.5163;$ $\nu = 64.0$
$r_6 = -249.9$
$l_2 = 74.0$
*Inventor:*
Robert Richter Patented July 31, 1934

1,968,222

UNITED STATES PATENT OFFICE 1,968,222

CONVERGING ACHROMATIC EYEPIECE

Robert Richter, Jena, Germany, assignor to firm Carl Zeiss, Jena, Germany

Application June 14, 1933, Serial No. 675,760
In Germany June 22, 1932

1 Claim. (Cl. 88—57)

I have filed an application in Germany, June 22, 1932.

Converging achromatic eye-pieces of the kind used for instance in prismatic telescopes have been given spherical lens surfaces only, although it could have been assumed that they may be improved by lens surfaces deviating from the spherical form. However, no satisfactory result has been obtained, because the experience made with non-spherical lens surfaces in other instruments may not be readily turned to account in the case of eye-pieces.

The present invention provides for the first time the possibility of so constructing achromatic eye-pieces which have non-spherical surfaces and are to enlarge the sharp image of an objective, that their efficiency is distinctly improved by this form of the lens surfaces. The improvement is attained by making at least one of the lens surfaces to deviate from a spherical surface which touches the vertex of the lens surface and has the same vertex curvature as this surface that the marginal thickness of the lens in question is increased by at least 1/30 of the lens diameter. Accordingly, the invention provides a wide-angle eye-piece; in which the available image field has in the front focal plane of the eye-piece a diameter that is at least as great as the focal length of the eye-piece; whose distortion is eliminated; in which the difference between the enlargements of the colours red and blue is removed without use being made of more than one lens of flint glass; in which the astigmatism is reduced at the margin of the image field to such an extent that it has only such a value as results from the Petzval image curvature; in which the deviation of the locus of the eye is eliminated or even assumes a value reverse to the ordinary one, so that the shadow phenomena in the field of view are reduced; and in which the brilliancy is increased by approximately 12% by reducing the free lens groups. This increase of the brilliancy is due to the fact that it is possible, as a rule, to attain the requisite quality of correction already with two self-contained groups of lenses, that is to say with only four lens surfaces bounded by air.

A constructional example of an eye-piece according to the invention and for use in a prismatic telescope is represented in the accompanying drawing, the example having the following constructional data:

$r_1 = \infty$
$d_1 = 30.0$; $n_d = 1.5163$; $\nu = 64.0$
$r_2 = -162.5$
$l_1 = 1.5$
$r_3 = 71.5$
$d_2 = 50.0$; $n_d = 1.5163$; $\nu = 64.0$
$r_4 = -200.0$
$d_3 = 6.5$; $n_d = 1.6477$; $\nu = 33.9$
$r_5 = 100.0$
$d_4 = 30.0$; $n_d = 1.5163$; $\nu = 64.0$
$r_6 = -249.9$.

The focal length is 100. The image-field diaphragm D is at a distance $l_2 = 74$ from the first lens surface and has a diameter of 120. The lens $L_1$ has a diameter of 150, and the lenses $L_2$ and $L_3$ have diameters of 132. The front surface of the rear member is a non-spherical surface, that is to say a paraboloid surface the radius of the vertex of which is 71.5. By making use of the paraboloid surface, the marginal thickness of the lens $L_2$ is increased by 13.5, viz. from $-5.2$ to $+8.3$. The spherical surface having the radius 71.5 is represented in the drawing by dash-lines. Choosing as a non-spherical surface the first surface of the rear member has proved to be specially convenient, since it has proved to be advantageous in an eye-piece consisting of two self-contained groups of lenses to provide that generally that surface of the second group of lenses is non-spherical which is first struck by the light.

I claim:

A converging achromatic eye-piece, consisting of two self-contained groups of lenses, the first surface of the lens group second in the direction of the light so deviating from a spherical surface touching its vertex and having an equal vertex curvature that the marginal thickness of the lens in question is increased by at least 1/30 of the lens diameter.

ROBERT RICHTER.